United States Patent
Kirchmeier et al.

(10) Patent No.: US 7,161,818 B2
(45) Date of Patent: Jan. 9, 2007

(54) HIGH FREQUENCY EXCITATION SYSTEM

(75) Inventors: Thomas Kirchmeier, Teningen (DE); Wolfgang R. H. Oestreicher, Munich (DE)

(73) Assignee: Huttinger Elektronik GmbH + Co. KG, Freiburg (DE)

( * ) Notice: Subject to any disclaimer, the term of this patent is extended or adjusted under 35 U.S.C. 154(b) by 194 days.

(21) Appl. No.: 10/868,535

(22) Filed: Jun. 15, 2004

(65) Prior Publication Data

US 2005/0088855 A1  Apr. 28, 2005

Related U.S. Application Data

(63) Continuation of application No. PCT/EP02/014217, filed on Dec. 13, 2002.

(30) Foreign Application Priority Data

Dec. 15, 2001  (DE) ................ 101 61 743

(51) Int. Cl.
*H02M 7/5387* (2006.01)
*H02M 3/335* (2006.01)
*H02M 3/24* (2006.01)
*H02H 7/10* (2006.01)

(52) U.S. Cl. ............... 363/132; 363/17; 363/98
(58) Field of Classification Search .......... 363/16, 363/17, 56.01, 56.02, 97, 98, 131, 132
See application file for complete search history.

(56) References Cited

U.S. PATENT DOCUMENTS

| | | | |
|---|---|---|---|
| 4,295,103 A | 10/1981 | Ljudmirsky | |
| 4,758,941 A * | 7/1988 | Felton et al. | 363/132 |
| 5,469,098 A | 11/1995 | Johnson, Jr. | |
| 5,612,646 A * | 3/1997 | Berning | 330/10 |
| 5,751,560 A | 5/1998 | Yokoyama | |
| 5,942,884 A * | 8/1999 | Soar et al. | 323/282 |
| 6,130,831 A * | 10/2000 | Matsunaga | 363/98 |
| 6,201,719 B1 * | 3/2001 | He et al. | 363/72 |
| 6,344,768 B1 * | 2/2002 | Daun-Lindberg et al. | 327/424 |
| 6,804,125 B1 * | 10/2004 | Brkovic | 363/17 |
| 6,819,574 B1 * | 11/2004 | Xu et al. | 363/21.04 |

FOREIGN PATENT DOCUMENTS

| | | |
|---|---|---|
| DE | 36 38 880 | 5/1987 |
| DE | 41 12 161 | 10/1992 |
| DE | 42 21 907 | 1/1994 |
| DE | 43 22 608 | 1/1995 |
| DE | 43 37 504 | 5/1995 |
| DE | 196 16 187 | 11/1997 |
| DE | 197 19 064 | 11/1997 |
| DE | 198 21 993 | 11/1998 |
| DE | 199 21 051 | 11/2000 |

(Continued)

*Primary Examiner*—Matthew V. Nguyen
(74) *Attorney, Agent, or Firm*—Fish & Richardson P.C.

(57) ABSTRACT

A power module is adapted to be connected to a voltage source and to supply power to a load. The power module includes a switching bridge that includes a first power transistor and a second power transistor, a first gate controller for driving the first power transistor and a second gate controller for driving the second power transistor. The first gate controller includes a first gate transformer, and a leakage inductance of the first gate transformer forms a resonant circuit with an input capacitance of the first power transistor. The second gate controller includes a second gate transformer, and a leakage inductance of the second gate transformer forms a resonant circuit with an input capacitance of the second power transistor.

21 Claims, 5 Drawing Sheets

FOREIGN PATENT DOCUMENTS

| | | |
|---|---|---|
| DE | 100 08 485 | 9/2001 |
| EP | 0 534 068 | 3/1993 |
| EP | 1 043 108 | 10/2000 |

\* cited by examiner

HIGH FREQUENCY EXCITATION SYSTEM

CROSS REFERENCE TO RELATED APPLICATIONS

This is a continuation of PCT application no. PCT/EP02/014217, filed Dec. 13, 2002, claiming priority from German application number 101 61 743, filed on Dec. 15, 2001. The entire contents of the above PCT application are herein incorporated by reference.

TECHNICAL FIELD

This invention relates to power supply systems and more particularly to a high frequency excitation system.

BACKGROUND

High frequency excitation arrangements are necessary, for example, for excitation of a plasma for use in a gas laser (e.g., a $CO_2$ laser). Other applications include deposition of thin layers and plasma etching. For plasma excitation, it is generally possible to input the power directly with a DC voltage or a low-frequency AC voltage. Alternatively, the coupling can take place capacitively through a dielectric with a high-frequency voltage.

German patent serial no. DE 43 22 608 C2 discloses a device that includes electrodes for capacitively coupling power into the plasma. The electrodes are connected to a voltage source through at least one resonant circuit and at least one output stage. The output stage includes two switching elements that can be inversely driven, and the switching signals of the switching elements can be supplied to the resonant circuit. The resonant circuit is a series resonant circuit and the modulation of the power coupling occurs starting from the resonant frequency by a variation of the switching frequency. A sine form voltage is generated by the series resonant circuit, which is present at the electrodes. The switching elements are driven by a driver circuit that requires a complex potential isolation of an auxiliary supply. If MOSFETs are used as the switching elements, high power loss occurs, because the gate source capacitance of the switching elements must be reloaded through the internal resistance of the driver circuit.

SUMMARY

In one general aspect, a power module is adapted to be connected to a voltage source and to supply power to a load. The power module includes a switching bridge that includes a first power transistor and a second power transistor, a first gate controller for driving the first power transistor and a second gate controller for driving the second power transistor. The first gate controller includes a first gate transformer, and a leakage inductance of the first gate transformer forms a resonant circuit with an input capacitance of the first power transistor. The second gate controller includes a second gate transformer, and a leakage inductance of the second gate transformer forms a resonant circuit with an input capacitance of the second power transistor.

In another general aspect, a high frequency excitation system includes a load, a power module adapted to be connected to a voltage source and adapted to supply power to the load, and a power transformer connected to the power module and connected to the load, where the power transformer is adapted to form a series resonant circuit with the load when the power module supplies power to the load. The power module includes a switching bridge that includes a first power transistor and a second power transistor, a first gate controller for driving the first power transistor and a second gate controller for driving the second power transistor. The first gate controller includes a first gate transformer, and a leakage inductance of the first gate transformer forms a resonant circuit with an input capacitance of the first power transistor. The second gate controller includes a second gate transformer, and a leakage inductance of the second gate transformer forms a resonant circuit with an input capacitance of the second power transistor.

One or more of the following features may be included. For example, the switching bridge can further include a third power transistor and a fourth power transistor, a third gate controller for driving the third power transistor, and a fourth gate controller for driving the fourth power transistor. The third gate controller includes a third gate transformer, and a leakage inductance of the third gate transformer forms a resonant circuit with an input capacitance of the third power transistor. The fourth gate controller includes a fourth gate transformer, and a leakage inductance of the fourth gate transformer forms a resonant circuit with an input capacitance of the fourth power transistor.

At least one of the first gate transformer and the second gate transformer can include a low frequency ferrite. The first gate controller can further include a first impulse generator for creating pulses to the first power transistor, and wherein the second gate controller further includes a second impulse generator for creating pulses to the second power transistor. The first impulse generator can include a first capacitor in parallel with an first input capacitance of the first power transistor and a first switching element, and the second impulse generator can include a second capacitor in parallel with an second input capacitance of the second power transistor and a second switching element.

The load can be a gas in which a plasma can be created when the power module supplies power to the load. The load can be a laser-active gas medium of a gas laser. The power transformer can include a tunable air-core coil. The power transformer can include an autotransformer. The power transformer can include rigid wire windings. The system can further include a voltage detector for detecting a voltage at the power transformer. The system can further include a strip line for connecting the power transformer to the power module.

In another general aspect a method of supplying power from the power module to ignite a plasma in a load includes, before the load includes an ignited plasma, providing power to the load at a frequency that is non-resonant with a characteristic frequency of the load, and when the load includes an ignited plasma, providing power to the load at a frequency that is resonant with the characteristic frequency of the load.

The method can include one or more of the following features. For example, the method can further include monitoring a voltage supplied to the load to determine when a plasma in the load is ignited. The method can further include supplying power to the load in a chain of short pulse-width pulses to ignite the plasma.

In another general aspect a method of supplying power from the power module to a load can include controlling an input power to the power module by controlling a frequency of a signal supplied to the power module and controlling a load power supplied by the power module by controlling a duty cycle of pulses output from the power module.

The power transformer can have several functions. On the one hand, it can convert the voltage transformation of the trapezoid wave voltage or square wave voltage delivered by the power module in the frequency range 2 to 4 MHz into a sine-wave voltage in the range of 3 to 6 kV. Thus, the transformer acts as sine filter or Fourier filter. The matching of the load can occur by choosing the frequency range. Therefore, a matching network, which is used often in the state of the art, is not necessary, and a significant saving of devices can be achieved. Furthermore, the load can be actively included in the power transfer, in that, for example, the capacitance of the electrodes of the load is used as the capacitance of the resonant circuit, so that a resonant circuit capacitor is not necessary. The arrangement may generally be employed with plasma methods (e.g., as used in gas lasers). However, it is also possible to use the arrangement for induction heating, for light generation, and in inductively coupled plasma ("ICP") applications.

A symmetrical arrangement can be provided for the power transformer in which the power transformer doubles the electrode voltage that can be generated compared to an unsymmetrical arrangement having the same maximum voltage to ground.

If the power transformer is embodied as a tunable aircore coil, an additional ferrite core can be provided to tune the inductance and the coupling of the power transformer. A potential separation of the primary and secondary windings is possible if an aircore coil is used. The power transformer can be an autotransformer having an aircore coil or with an additional ferrite core. The windings of the power transformer can be made of rigid wire, in which case relatively lower power losses occur at the operating frequencies compared to when a high frequency braided wire is used.

A measuring device (e.g., a voltage detector) can be provided at the power transformer for detecting whether ignition of a gas discharge (e.g., in the active medium of a gas laser) has taken place. The information concerning whether ignition has occurred can be used for controlling of a turn-on sequence.

Tuning elements can be integrated into the power transformer, which allows additional discrete components to be eliminated from the arrangement.

If the power transformer is connected to the power module by means of a strip line, a particularly good cooling of the line between the power module and the load may be achieved due to the large surface of the strip line.

The switching bridge of the power module can include at least two semiconductor switches (e.g., power transistors or power MOSFETs), which are each driven by a gate driver. With such an arrangement, a switching power supply with a variable high frequency in the range of 2–4 MHz can be realized. The supply voltage of the switching bridge can be taken directly from the AC network by rectifying, such that the use of a network transformer is not necessary. A half bridge as well as a full bridge may be used as the switching bridge. The gate driver can act as the potential-separated driving of the semiconductor switches of the switching bridge.

The gate driver can include at least two gate controls with a driver output stage and a gate transformer, respectively. In the gate driver, two clock signals, offset by 180°, can be increased to a voltage of, for example, 12 V. Subsequent complementary emitter followers can drive the driver output stage. The driver output stage can be a push-pull circuit of two power transistors (e.g., MOSFETs). The driver output stage can be a full bridge that includes two additional complementary emitter followers, respectively.

The driver output stage can generate a symmetrical square wave voltage for excitation of the gate transformer. The advantage of using a gate transformer is that no auxiliary supply with separated potential is necessary, as would be the case, for example, with a conventional driver circuit.

When the leakage inductance of the gate transformer forms a resonant circuit with the input capacitance of the driven power transistor, a sine-wave like form of the gate voltage at the driven power transistor can develop, because the circuit is operated at a frequency close to of its self-resonance. A sine-wave like gate current has a positive effect on the electromagnetic compatibility and can save power, depending on the performance of the resonant circuit.

The gate transformer can be a low-frequency ferrite having a loss factor that increases with increasing frequency and a permeability that decreases with increasing frequency. The resonant curve of the arrangement is broadened by both characteristics, and the useful frequency range of the arrangement is increased. Furthermore, the core loss factor together with the active component of the input impedance of the power transistor causes a low quality of the gate resonant circuit, such that the gate resonant circuit is quickly stimulated and quickly dies out, which is advantageous for fast pulsing operation.

An impulse generator can be provided for each power transistor. During operation of the switching bridge, the power transistors connected in series can have a conducting phase of less than 180°, such that both power transistors are not conducting simultaneously. However, the conducting phase can be extended due to the voltage dependence of the input capacitance of the power transistors and by the different time delays when switching on and off, such that the pulse duty factor is reduced. This is done by the impulse generator, which extends the negative drive phase (i.e., the off-state phase) in relation to the positive drive phase and at the same time reduces the negative amplitude of the gate voltage.

The impulse generator can be formed by a capacitor in parallel with the input capacitance of the power transistor and a switching element. In this manner, the capacitor is only switched on during the negative drive phase in parallel with the input capacitance of the power transistor. An auxiliary transistor can be the switching element, which is driven by the voltage of the switched capacitor itself, but no additional voltage supply is necessary on the secondary side of the gate transformer. Thus, in a simple way, the impulse is generated, and the pulse duty factor of the gate voltage are adjusted.

If the switching bridge is operated at the maximum supply voltage, the load (e.g., a gas laser with an unignited gas discharge) may absorb insufficient power, such that the switching bridge is be damaged due to excess voltage, depending on the construction of the switching bridge. To avoid this, precautionary measures are useful. Therefore, the ignition process can be controlled to occur at such a high frequency that only little power is coupled into the switching bridge. In particular, the ignition process can take place at the highest operating frequency of the device. If the frequency is changed after the ignition process to be closer to the self-resonant frequency, an optimum power coupling into the load can be achieved.

The voltage of the load can be monitored. For example, an ignition of the plasma may can be monitored by a voltage detector, which is capacitively coupled (e.g., close to the electrodes of the load). Advantageously, a voltage sensor (e.g., a capacitive electrode) can be disposed at the power transformer. The plasma of the load can be ignited by an ignition sequence, in particular, by pulse chains having short pulse-widths of the individual pulses. In this manner, the power to be switched is limited, and damage of the power transistors of the switching bridge may be avoided. This state is maintained until the ignition of the gas discharge is detected by the voltage detector. Both measures mentioned above may also be provided together.

An autonomous adjustment of the frequencies for the previously mentioned ignition actions as well as the frequency limits for the power control can be implemented. This autonomous adjustment can take place during the start-up of a module at the laser in a software-controlled calibration sequence.

The input power of each power module can be controlled independently by the frequency, and the load power for all power modules can be controlled synchronously through the duty cycle of pulses of the signals "HF on/HF off." The input power of each power module is therefore controlled independently from the load power. The duty cycle of pulses of the signals "HF on/HF off" may occur in a duty cycle of pulses between 0 and 100%, and pulse frequencies in the range of 10 Hz to 100 kHz can be provided. The pulse signal is given by the central laser control.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A power module can be connected to a load through a power transformer, in which, during operation, the power transformer creates a series resonant circuit with the load. Thus, the leakage reactances of the power transformer may be used for matching the power.

Figure 1:
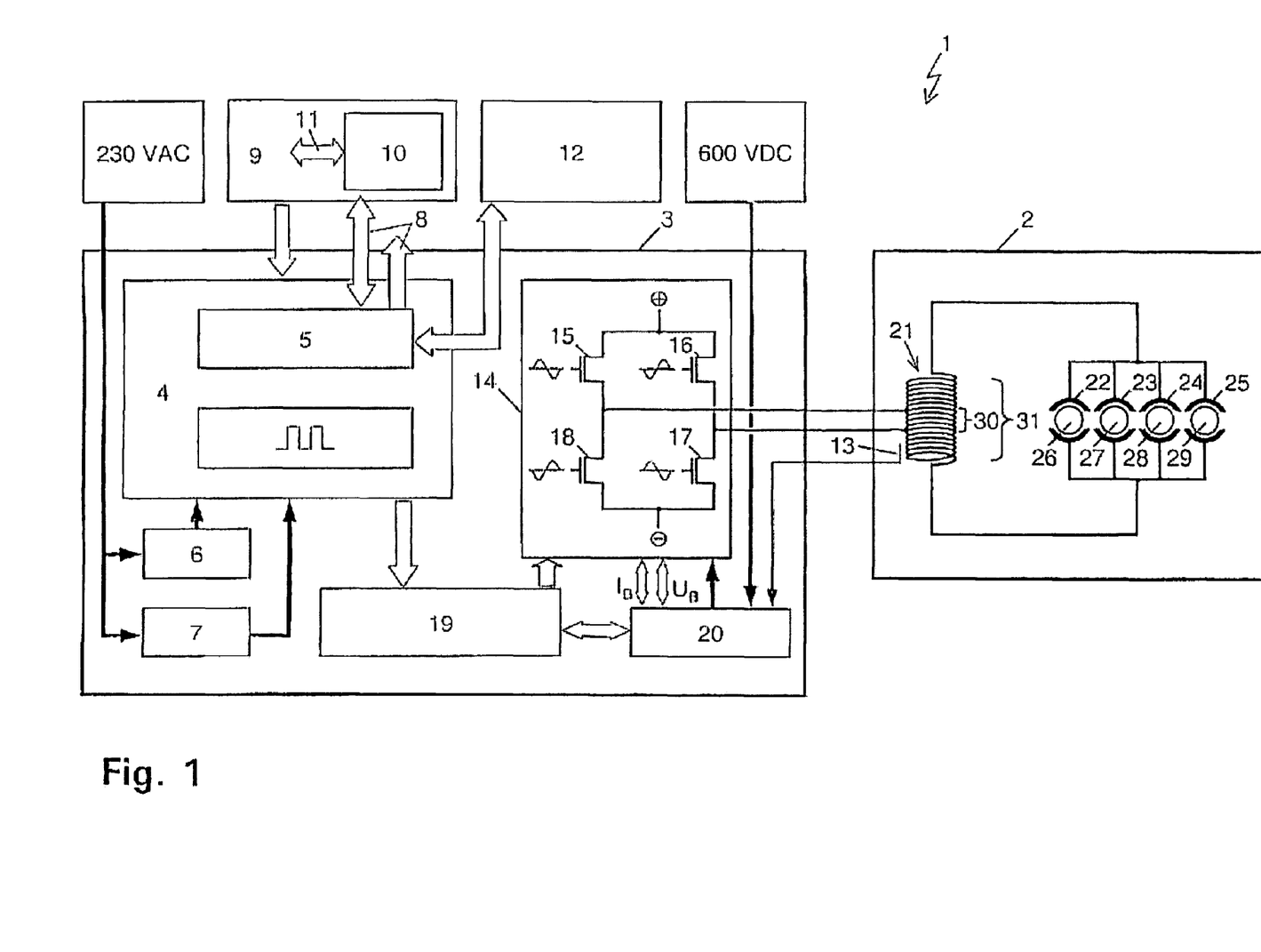
FIG. 1 is a schematic diagram of a high frequency excitation arrangement for operating a gas laser.

As shown in FIG. 1 a high frequency excitation arrangement 1 can be used to generate a plasma (e.g., in a laser 2). A power module 3 of the arrangement 1 includes a control card 4 that has a micro-controller 5. To supply voltage to the control card 4 or to devices arranged on the control card, the alternating current (AC) supply voltage can be transformed into the voltage required by the control card 4 and its device by a first auxiliary power unit 6 and a second auxiliary power unit 7 of the power module 3. The micro-controller 5 of the control card 4 is connected to a central control unit 9 through a Controller Area Network (CAN) bus 8. A micro-controller on a bus master card 10 of the central control unit 9 converts the data of the CAN bus 8 into data of a field bus 11 (e.g., a Profi bus), which provides a connection to a laser controller. For service operation, the control card 4 may furthermore be connected to a computer unit 12 through a serial interface. The actual power generation occurs through a series resonant transformer (as explained in further detail below) that encompasses a full bridge circuit.

A switching bridge 14, which can be a full bridge, includes power transistors (e.g., power MOSFETs 15–18), the gates of which are driven by a gate driver 19. The gate driver 19 is controlled by the control card 4. The switching bridge 14 is supplied with a voltage directly by the AC network through rectification, where the rectification is performed outside the high frequency excitation arrangement 1. Thus, an intermediate DC voltage of approximately +/−300 V is present at the switching bridge 14. The switching bridge 14 operates according to the switching principle of class D amplifiers and, if a signal "HF on" is present at the bridge, feeds the intermediate DC voltage to the output of the switching bridge 14 as a trapezoid-wave voltage in the frequency range 2–4 MHz. The DC input power that is measured by a measuring board 20 is controlled through the frequency. The output power of the laser 2 is not adjusted by this control if the DC input power but through pulsing of the "HF on/HF off" signal with variable duty cycle control and a pulsing frequency of 10 Hz–100 kHz. The pulsing is determined by the central control 9 and is transmitted to the control card 4.

The amplitude of the high-frequency trapezoid-wave output voltage of the switching bridge 14 is, depending on the application, transformed through a power transformer 21 to approximately 4 kV and applied as a sine wave voltage to the capacitive electrodes 22–25 at the discharge tubes 26–29 of the laser 2, which can be a single gas laser. The power transformer 21 can be a single-core transformer, in which the primary coil 30 is formed by tapping of the secondary coil 31. A capacitive electrode 13 at the secondary winding of the power transformer gathers the secondary winding voltage and thus also the voltage at the load (e.g., discharge tubes 26–29). The electrode 13 is connected through a lead to the measurement board 20. The detection of plasma ignition is obtained from the voltage signal at the measurement board 20, where ignition detection releases the power after the ignition of the gas discharge. Several power modules 3 may be provided, each typically supplying four discharge tubes 26–29. It has been found that, if several discharge tubes belong to a single gas laser and are optically coupled and are connected to a common gas circulation system for exchanging gas between the discharge tubes 26–29 (e.g., for cooling purposes), the plasma ignition occurs for all discharge tubes 26–29 approximately simultaneously, i.e., as soon as one discharge tube has ignited. The number of power modules used for a single laser is determined by the power class of the laser.

Figure 2:
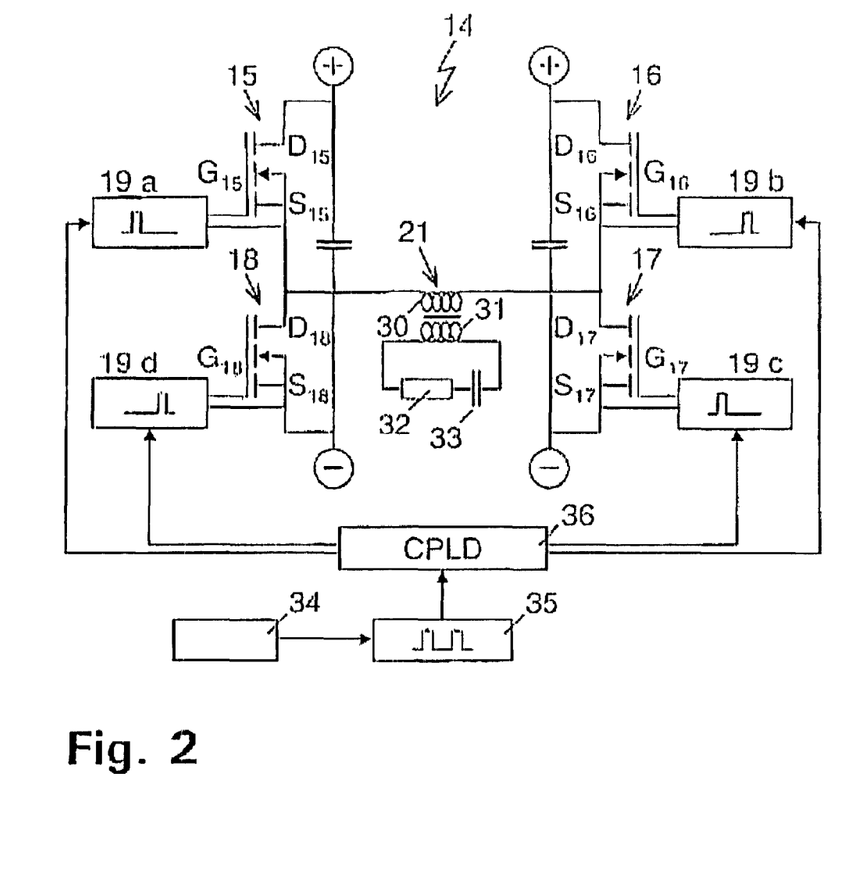
FIG. 2 is a schematic diagram of a full bridge of the power module of the high frequency excitation arrangement according to FIG. 1.

As shown in FIG. 2, the switching bridge 14 of the power module 3 includes power MOSFETs 15–18. MOSFETs 15 and 16 are connected with their drains D15 and D16 to a positive intermediate circuit DC voltage, and the sources S17 and S18 of the MOSFETs 17 and 18 are connected to the negative intermediate circuit DC voltage, respectively. The source S15 is connected to the drain D18, and the source S16 is connected to the drain D17. The terminals S15, D18, S16, and D17 lies at the output voltage $U_{out}$ across the primary coil 30 of the power transformer 21. Thus, $U_{out}$ is the reference potential for driving the power transistors 15 and 16, and the negative intermediate circuit DC voltage is the reference potential for driving the power transistors 17 and 18. The secondary coil 31 of the power transformer 21 forms a series resonant circuit together with the plasma resistance 32 and the capacitance 33, which is, for example, formed by the electrode capacitance of the laser 2.

The MOSFETs 15–18 are driven by a gate control 19$a$, 19$b$, 19$c$, and 19$d$ (and described in greater detail below). A control 34 sets a frequency for an oscillator 35, and the oscillator signal is separated in a distributor 36 into clock signals Takt$_1$ and Takt$_2$, which are offset by 180°. The clock signal Takt$_1$ is supplied to the gate controls 19$a$ and 19$c$ of the power transistors 15 and 17, respectively, and the clock signal Takt$_2$ is supplied to the gate controls 19$b$ and 19$d$ of the power transistors 16 and 18, respectively.

Figure 3A:
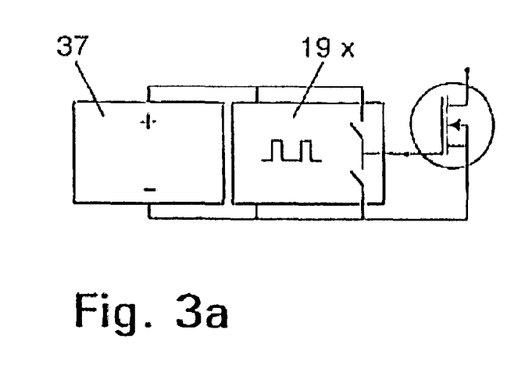
FIG. 3a is a schematic diagram of a gate control directly coupled to a MOSFET to be driven, with a current supply unit, which is held at the source potential of the MOSFET to be driven.

As shown in FIG. 3$a$ one or more of the gate controls (collectively denoted as 19$x$), which are directly connected to a MOSFET to be driven and an associated current supply unit 37 can be disposed with a floating ground. The current supply unit 37 must ensure a safe separation of the mains potential at a frequency of up to 4 MHz.

Figure 3B:
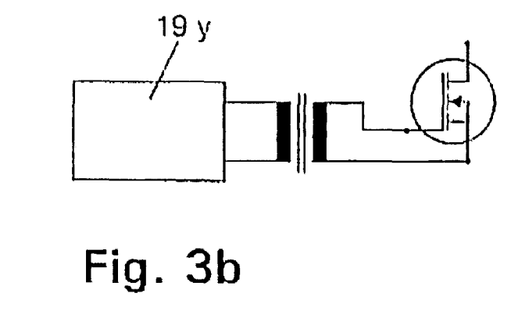
FIG. 3b is a schematic diagram of a gate control coupled to a MOSFET to be driven by means of a transformer, in which the gate control is held at ground potential.

As shown in FIG. 3$b$, one or more gate controls (collectively denoted as 19$y$) can be coupled potential-free to a MOSFET to be driven by a transformer with separated windings, which allows the gate driver 19$y$ to be held at ground potential.

Both arrangements according to FIG. 3$a$ or FIG. 3$b$ are suitable for driving the MOSFETs 15 and 16 on the one hand and 17 and 18 on the other hand in FIG. 2, which are at different potentials.

Figure 4:
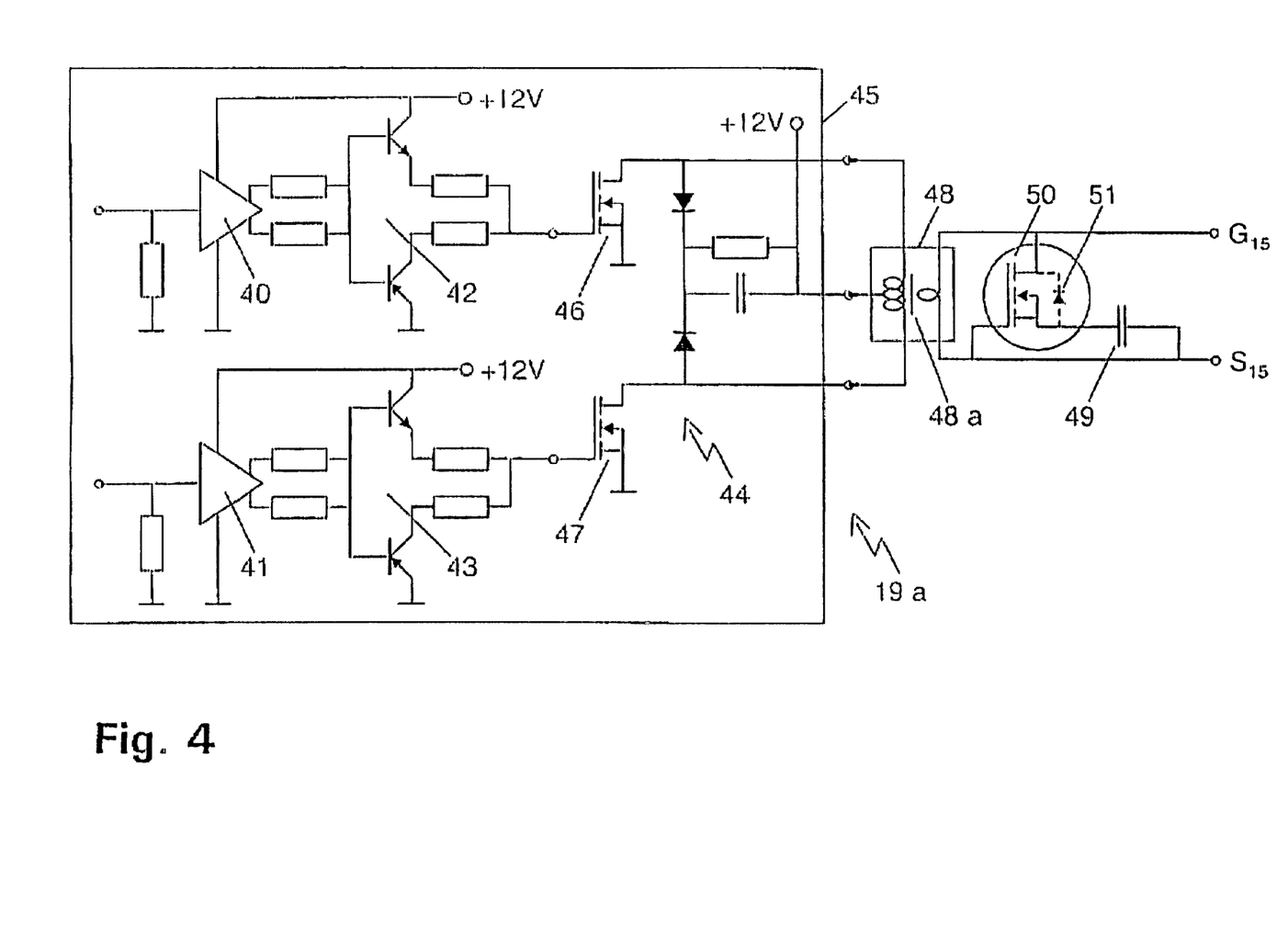
FIG. 4 is a schematic diagram of a gate driver of the high frequency excitation arrangement of FIG. 1.

As shown in FIG. 4, the gate control 19$a$ of the power transistor 15 can make use of the transformer coupling shown in FIG. 3$b$ (see also the description below of the gate transformer 48). The clock signals Takt$_1$ and Takt$_2$ are offset by 180° and are transformed to 12V in driver ICs 40 and 41 with a delay of only about 20 ns. Subsequent complementary emitter followers 42 and 43 drive the driver output stage 44 of the gate control 19$a$. Each gate control 19$a$, 19$b$, 19$c$, and 19$d$ includes a driver output stage 44, which are all driven in parallel by their complementary emitter followers 42 and 43. The driver output stage 44 is part of a multi-stage impulse amplifier unit 45 on the low-voltage side. The driver output stage 44 can be realized as a push-pull circuit with two transistors 46 and 47 (e.g., MOSFETs). The driver output stage 44 generates a symmetrical square-wave voltage at the gate transformer 48. The leakage inductance of the gate transformer 48 forms a resonant circuit together with the input capacitance of the driven power transistor 15. Thus, at the driven power transistor 15 a sine wave-like waveform of the gate voltage develops, because the circuit is operated with a frequency close to its self-resonance. For the gate transformer 48, a core 48$a$ can be made of low-frequency ferrite, which has, in the operating frequency range of 2–4 MHz, a power loss factor that increases with increasing frequency and a permeability that strongly decreases with increasing frequency. Thus, the width of the resonant curve is increased.

The capacitor 49 is in parallel with the input capacitance of the power transistor 15, however, only during the negative drive phase of the gate voltage. The switching element 50 can be a logic level auxiliary MOSFET that is switched by the voltage of the switched capacitor 49 itself. Thus, the recovery behavior of a body diode 51 of the switching element 50 can be made use of. The capacitor 49 and the switching element 50 form an impulse generator.

Figure 5:
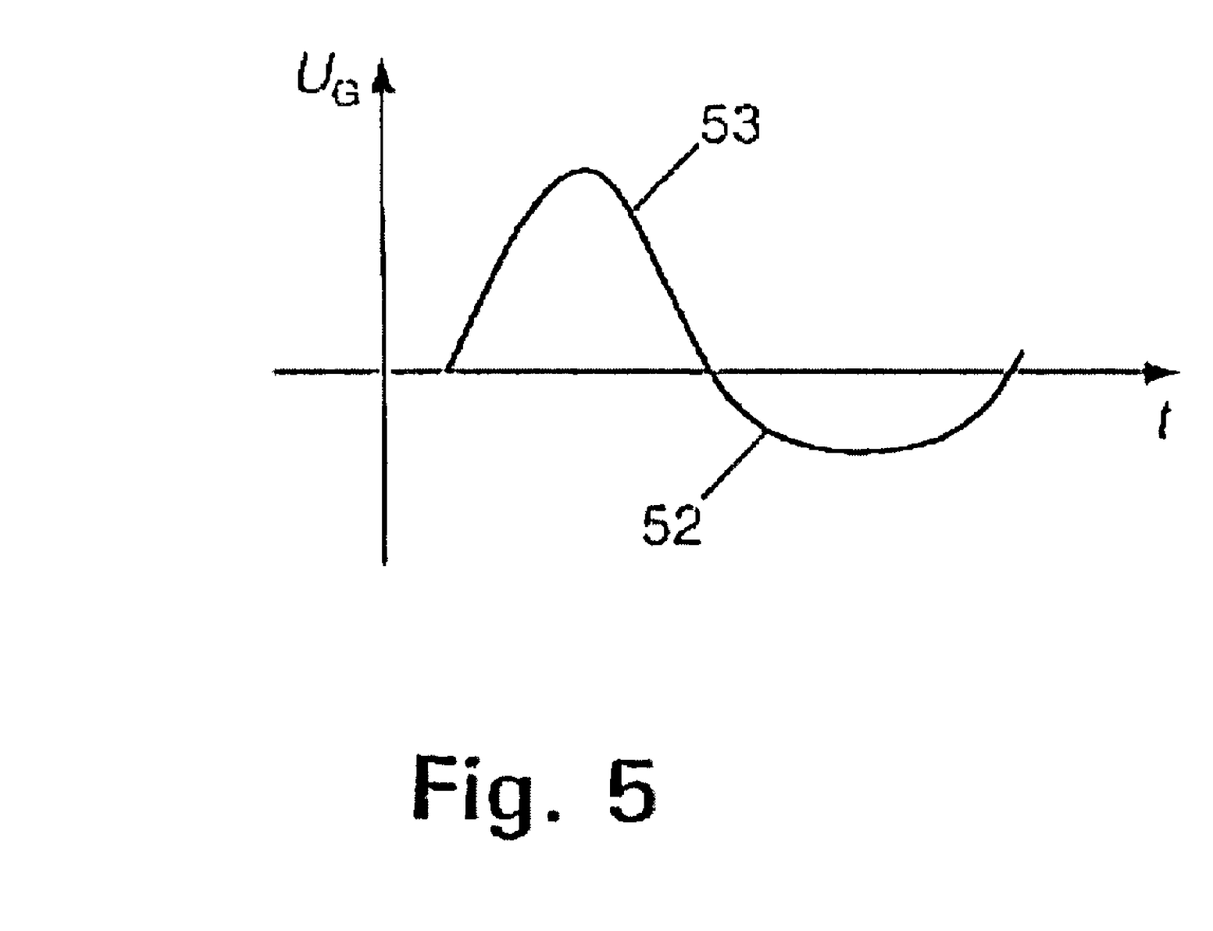
FIG. 5 is a schematic diagram the temporal behavior of the gate voltage UG present at the power transistors of the full bridge of the high frequency excitation arrangement.

As shown in FIG. 5, the negative drive phase 52 of the gate voltage UG is extended compared to the positive drive phase 53 because of the capacitor 49. At the same time, the amplitude of the negative drive voltage is reduced. The capacitor 49 therefore forms an impulse-generator circuit that reduces the drive duty cycle. This is useful, because the conducting phase can be extended due to the voltage dependence of the input capacitance of the MOSFET 15 and due to different turn-on and turn-off delays.

Figure 6:
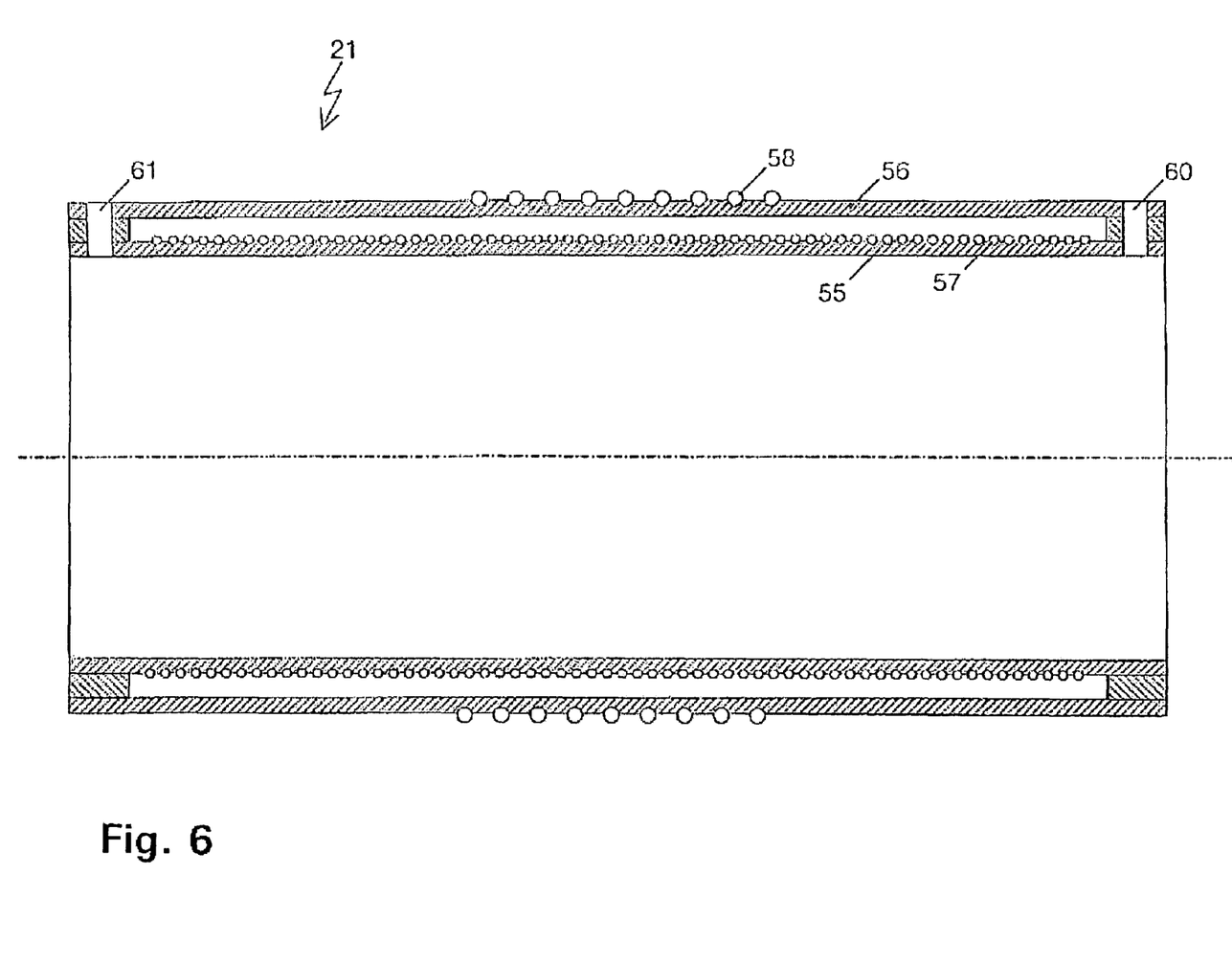
FIG. 6 is a longitudinal sectional view through a power transformer with separated windings.

As shown in FIG. 6, a power transformer 21 includes two concentric coil bodies 55 and 56 made of dielectric material. Coil body 55 carries the secondary winding 57, and coil body 56 carries the primary winding 59. Each winding 57 and 59 is made of silver-coated copper wire, and the primary winding 59 is disposed outside the secondary winding 57. The coil body 56 is held through holders 60, 61 at the coil body 55. This transformer is provided in a different embodiment instead of the transformer of FIG. 1.

In a high frequency excitation arrangement 1 including a switching bridge 14 and at least one power module 3 to be connected to a voltage source and to a load, the power module 3 is connected to the load through a power transformer 21 in such a manner that during operation the power transformer 21 achieves a filtering and the power transformer 21 forms a series resonant circuit with the load, and the leakage reactances of the power transformer 21 are used for the power tuning. The power transformer thus takes over several functions, such that separate devices can be saved.

A number of implementation have been described. Nevertheless, it will be understood that various modifications may be made. Accordingly, other implementations are within the scope of the following claims.

What is claimed is:

1. A power module adapted to be connected to a voltage source and to supply power to a load, the power module comprising:
    a switching bridge that includes a first power transistor and a second power transistor;
    a first gate controller for driving the first power transistor, wherein the first gate controller includes a first gate transformer and wherein a leakage inductance of the first gate transformer forms a resonant circuit with an input capacitance of the first power transistor; and
    a second gate controller for driving the second power transistor, wherein the second gate controller includes a second gate transformer and wherein a leakage inductance of the second gate transformer forms a resonant circuit with an input capacitance of the second power transistor.

2. The power module of claim 1, wherein the switching bridge further includes a third power transistor and a fourth power transistor, and wherein the system further comprises:
    a third gate controller for driving the third power transistor, wherein the third gate controller includes a third gate transformer and wherein a leakage inductance of the third gate transformer forms a resonant circuit with an input capacitance of the third power transistor; and
    a fourth gate controller for driving the fourth power transistor, wherein the fourth gate controller includes a fourth gate transformer and wherein a leakage inductance of the fourth gate transformer forms a resonant circuit with an input capacitance of the fourth power transistor.

3. The power module of claim 1, wherein at least one of the first gate transformer and the second gate transformer includes a low frequency ferrite.

4. The power module of claim 1, wherein the first gate controller further includes a first impulse generator for creating pulses to the first power transistor, and wherein the second gate controller further includes a second impulse generator for creating pulses to the second power transistor.

5. The power module of claim 4,
wherein the first impulse generator includes a first capacitor in parallel with an first input capacitance of the first power transistor and a first switching element, and
wherein the second impulse generator includes a second capacitor in parallel with an second input capacitance of the second power transistor and a second switching element.

6. A high frequency excitation system comprising:
a load;
a power module adapted to be connected to a voltage source and adapted to supply power to the load, the power module comprising:
   a switching bridge that includes a first power transistor and a second power transistor,
   a first gate controller for driving the first power transistor, wherein the first gate controller includes a first gate transformer and wherein a leakage inductance of the first gate transformer forms a resonant circuit with an input capacitance of the first power transistor, and
   a second gate controller for driving the second power transistor, wherein the second gate controller includes a second gate transformer and wherein a leakage inductance of the second gate transformer forms a resonant circuit with an input capacitance of the second power transistor; and
a power transformer connected to the power module and connected to the load, wherein the power transformer is adapted to form a series resonant circuit with the load when the power module supplies power to the load.

7. The system of claim 6, wherein the load is a gas in which a plasma can be created when the power module supplies power to the load.

8. The system of claim 6, wherein the load is a laser-active gas medium of a gas laser.

9. The system of claim 6, wherein the power transformer includes a tunable air-core coil.

10. The system of claim 6, wherein the power transformer includes an autotransformer.

11. The system of claim 6, wherein the power transformer includes rigid wire windings.

12. The system of claim 6, further comprising a voltage detector for detecting a voltage at the power transformer.

13. The system of claim 6, further comprising a strip line for connecting the power transformer to the power module.

14. The system of claim 6, wherein the switching bridge further includes a third power transistor and a fourth power transistor, and wherein the system further comprises:

a third gate controller for driving the third power transistor, wherein the third gate controller includes a third gate transformer and wherein a leakage inductance of the third gate transformer forms a resonant circuit with an input capacitance of the third power transistor; and
a fourth gate controller for driving the fourth power transistor, wherein the fourth gate controller includes a fourth gate transformer and wherein a leakage inductance of the fourth gate transformer forms a resonant circuit with an input capacitance of the fourth power transistor.

15. The power module of claim 6, wherein at least one of the first gate transformer and the second gate transformer includes a low frequency ferrite.

16. The power module of claim 6, wherein the first gate controller further includes a first impulse generator for creating pulses to the first power transistor, and wherein the second gate controller further includes a second impulse generator for creating pulses to the second power transistor.

17. The power module of claim 16,
wherein the first impulse generator includes a first capacitor in parallel with an first input capacitance of the first power transistor and a first switching element, and
wherein the second impulse generator includes a second capacitor in parallel with an second input capacitance of the second power transistor and a second switching element.

18. A method of supplying power from the power module of claim 1 to ignite a plasma in a load, the method comprising:
before the load includes an ignited plasma, providing power to the load at a frequency that is non-resonant with a characteristic frequency of the load; and
when the load includes an ignited plasma, providing power to the load at a frequency that is resonant with the characteristic frequency of the load.

19. The method of claim 18, further comprising monitoring a voltage supplied to the load to determine when a plasma in the load is ignited.

20. The method of claim 18, further comprising supplying power to the load in a chain of short pulse-width pulses to ignite the plasma.

21. A method of supplying power from the power module of claim 1 to a load, the method comprising:
controlling an input power to the power module by controlling a frequency of a signal supplied to the power module; and
controlling a load power supplied by the power module by controlling a duty cycle of pulses output from the power module.

* * * * *